US005676220A

United States Patent [19]

Dapsi et al.

[11] Patent Number: 5,676,220

[45] Date of Patent: Oct. 14, 1997

[54] MANUAL CONTROL ARRANGEMENT FOR AN ADJUSTABLE MOTOR VEHICLE CONTROL PEDAL SYSTEM

[75] Inventors: Joseph J. Dapsi, Belleville; Patrick M. Palajac, Dearborn; Sandy J. Emerling, Troy, all of Mich.

[73] Assignee: Chrysler Corporation, Auburn Hills, Mich.

[21] Appl. No.: 582,546

[22] Filed: Jan. 3, 1996

[51] Int. Cl.$^6$ .................... B60K 26/00

[52] U.S. Cl. .................... 180/334; 74/512; 74/560

[58] Field of Search .................... 180/334; 74/512, 74/560, 513, 562, 522, 525, 518, 500.5, 501.6

[56] References Cited

U.S. PATENT DOCUMENTS

| | | | |
|---|---|---|---|
| 3,088,331 | 5/1963 | Bachmann | 74/560 |
| 3,282,125 | 11/1966 | Dully | 74/560 |
| 3,828,625 | 8/1974 | Bruhn, Jr. | 74/512 |
| 3,975,972 | 8/1976 | Muhleck | 74/560 |
| 4,683,977 | 8/1987 | Salmon | 180/334 |
| 5,351,573 | 10/1994 | Cicotte | 74/512 |
| 5,433,126 | 7/1995 | Corbett | 74/501.6 |

FOREIGN PATENT DOCUMENTS

| | | | |
|---|---|---|---|
| 0353958 | 2/1990 | European Pat. Off. | 180/334 |
| 0608155 | 7/1994 | European Pat. Off. | 180/334 |
| 2644626 | 4/1977 | Germany | 180/334 |

*Primary Examiner*—Christopher P. Ellis
*Attorney, Agent, or Firm*—William J. Coughlin

[57] ABSTRACT

A manual control arrangement for an adjustable control pedal system for a motor vehicle provides for pivotal adjustment of the control pedals relative to the vehicle driver. The manual control arrangement allows optimal adjustment of each of the control pedals of the motor vehicle (e.g. the brake and accelerator pedals for motor vehicles with automatic transmissions, or the brake, accelerator and clutch pedals for motor vehicle with manual transmissions) relative to driver so as to suit the needs of a particular driver for maximum comfort and operability. The manual control arrangement is preferably operatively arranged with each of the control pedals for simultaneous and uniform adjustment and is preferably interconnected with a plurality of camming devices corresponding in number to the number of control pedals. The camming devices slidably abut the pedal arm of the respective control pedal such that rotation of the camming device causes pivotable movement of the pedal arm relative to the motor vehicle driver.

17 Claims, 2 Drawing Sheets

MANUAL CONTROL ARRANGEMENT FOR AN ADJUSTABLE MOTOR VEHICLE CONTROL PEDAL SYSTEM

BACKGROUND OF THE INVENTION

1. Field of the Invention

The present invention relates in general to motor vehicle control pedals, namely brake, clutch and accelerator control pedals. More particularly, the present invention relates to a manual control arrangement for an adjustable motor vehicle control pedal system operable for manual adjustment of the brake, clutch and accelerator pedals relative to a vehicle occupant.

2. Description of the Prior Art

In a conventional manner, motor vehicle are provided with control pedals which are used by the operator to control the motion and speed of the motor vehicle. For example, motor vehicles equipped with automatic transmissions include an accelerator pedal and a brake pedal. Motor vehicles with manually transmissions additionally incorporate a clutch pedal. Typically, these control pedals are permanently fixed to the vehicle chassis and arranged to rotate away from the driver when foot pressure is applied and are not adjustable relative to the driver or their respective attachment points. As a result, it is necessary to position the control pedals relative to the floor of the passenger compartment so as to accommodate operation which is adequately comfortable for the "typical" driver. Due to varying physical attributes and comfort preferences, some adjustment of the driver relative to the control pedals is clearly desirable.

In modern motor vehicles, the driver's seat is mounted so as to be slidable in a fore direction and in an aft direction to generally accommodate drivers of varying physiques. Such an arrangement is only partially effective in positioning the driver relative to both the control pedals and the instrument panel. In this regard, seat adjustment allows the driver to simultaneously position himself or herself relative to the motor vehicle steering wheel, instrument panel, and the control pedals. To some degree, this adjustment permits improvement of driver comfort and further facilitates the driver's ability to operate the motor vehicle's control pedals. However, it is nearly impossible for such a single adjustment to accommodate all possible variations between human physiques. In particular, comfort preferences and proportional differences between the lengths of a driver arms, legs and feet in relation to the driver's overall physique cannot be readily accommodated through a single adjustment of the seat in one of a fore direction and an aft direction with respect to the control pedals. Accordingly, it has been recognized that some form of control pedal adjustment is desirable to provide optimal comfort to the driver while also ensuring that the driver can comfortably and fully operate the control pedals at all times.

Many approaches to providing adjustable control pedal have been suggested in the prior art. One approach is to provide some form of ratchet device which allows the entire control pedal system to rotate about a pivot axis. This approach rotates a frame. Two or more control pedals are each rotatably attached, to the frame, thereby providing rotation of the control pedals in unison relative to the driver. A similar approach is to mount one or more control pedals to a frame which is slidable fore and aft as a unit relative to the driver.

Another suggested approach is a variation on the two previously mentioned approaches employing a screw actuated device to displace a frame. One or more control pedals are rotatably mounted to the frame. The screw actuated device can be used to rotate the entire frame about a pivot axis. Additionally, the screw-actuated device can be used to displace the frame in either the fore direction or the aft direction. Typically, the screw-actuated device is disclosed to be driven by an eccentric motor which allows the control pedals to be selectively adjusted by the driver from an appropriated control mounted on the instrument panel of the vehicle within the driver's reach.

Yet another suggested approach is disclosed in U.S. Pat. No. 5,351,573 which teaches an adjustment device for an automobile control pedal which is capable of pivotably adjusting the control pedal relative to a datum point. The adjustment device includes a camming device which slidably abuts the pedal arm of the control pedal such that rotation of the camming device causes pivotable movement of the pedal arm relative to the datum point. Rotation of the camming device is accomplished with a drive motor which actuates a rod or lead screw rotatably engaged with a cam. The drive motor is pivotally attached to the pedal arm by a pivot pin and the lead screw is rotated by the drive motor. When the lead screw is rotated by the drive motor, the pivot pin is driven up or down the length of the drive screw. As the pivot pin follows the drive screw, the cam is forced to rotate about its axis of rotation, causing a corresponding rotation in the pedal arm relative to the cam's axis of rotation and the pushrod connection. As a result, a pedal foot pad can be selectively moved toward or away from the driver. U.S. Pat. No. 5,351,573 is hereby incorporated by reference as if fully set forth herein.

While prior known devices such as those discussed above have proven to be commercially successful each is associated with disadvantages or drawbacks. For example, control arrangements incorporating electric motors for purposes of adjustment do not provide the manual feel desired for various application. Additionally, with arrangements incorporating multiple electric motors it is difficult, it not impossible to adjust a plurality of control pedals at a uniform rate due to the expected variance between motor outputs.

SUMMARY OF THE INVENTION

Thus, it is a principal object of the present invention to provide a control arrangement for an adjustable motor vehicle control pedal system which can be easily controlled by the vehicle driver through a manually operable device located in the passenger compartment of the vehicle.

It is a related object of the present invention to provide a manual control arrangement for an adjustable motor vehicle control pedal system which simultaneously and uniformly adjusts each of the control pedals.

In one form, the manual control arrangement of the present invention is adapted for incorporation into an adjustable motor vehicle control pedal system including a plurality of control pedals and a corresponding plurality of camming members. Each of the control pedals include a pedal arm rotatable about an axis of rotation, One of the camming members is juxtaposed with each of the pedal arms. Each of the camming members includes a gear portion.

The manual control arrangement is operative for selectively rotating the camming members about their axis of cam rotation so as to produce a corresponding displacement of each of the controls pedals. The manually control arrangement includes a housing defining a cavity. A drive gear is disposed in the cavity and is fixedly attached to a shaft. A first end of the shaft extends from the housing. A control knob is attached to the first end Of the shaft. The manually control arrangement further includes a corresponding plurality of driven gears in meshing engagement with the drive gear and a corresponding plurality of rotatable cables. Each rotatable cable includes a first end operatively arranged with one of the driven gears and a second end terminating in a lead screw. The lead screw is operatively arranged with the gear portion of one of the camming members. Selective rotation of the control knob operates to adjust the pedal arms of each of the plurality of control pedals in one of a fore direction and aft direction.

BRIEF DESCRIPTION OF THE DRAWINGS

Additional objects and advantages of the present invention will become apparent from a reading of the following detailed description of the preferred embodiment which makes reference to the drawings of which.

DETAILED DESCRIPTION OF THE PREFERRED EMBODIMENT

As required, a detailed embodiment of the present invention is disclosed herein. However, it is to be understood that the disclosed embodiment is merely exemplary of the present invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
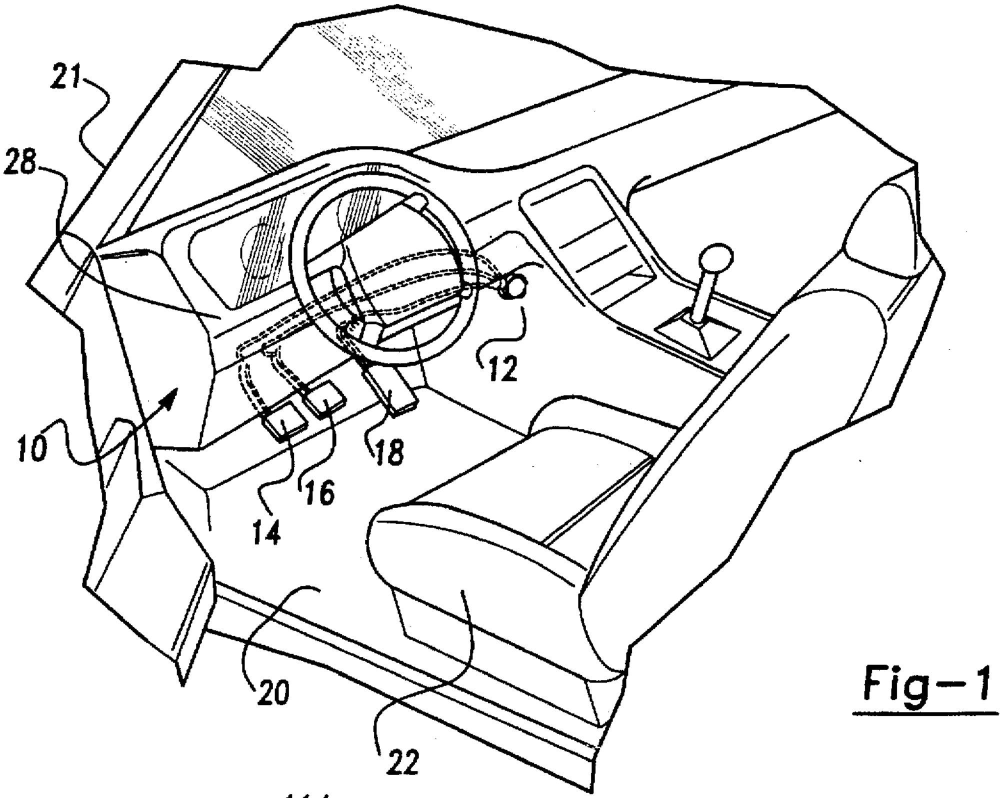
FIG. 1 is a simplified view of an adjustable motor vehicle control pedal system including a manual control arrangement constructed in accordance with the teachings of the preferred embodiment of the present invention illustrated incorporated into an exemplary use environment.

Turning to the drawings in which identical or equivalent elements have been denoted with like reference numerals, an adjustable motor vehicle control pedal system embodying the present invention is illustrated in FIG. 1 and has been identified generally at reference numeral 10. The present invention is primarily directed to a manual control arrangement 12 of the adjustable motor vehicle control pedal system 10. However, prior to turning to the details of the construction and operation of the control arrangement 12, an understanding of an exemplary system of adjustable control pedals with which the control arrangement 12 is particularly adapted to cooperate is warranted.

Figure 2:
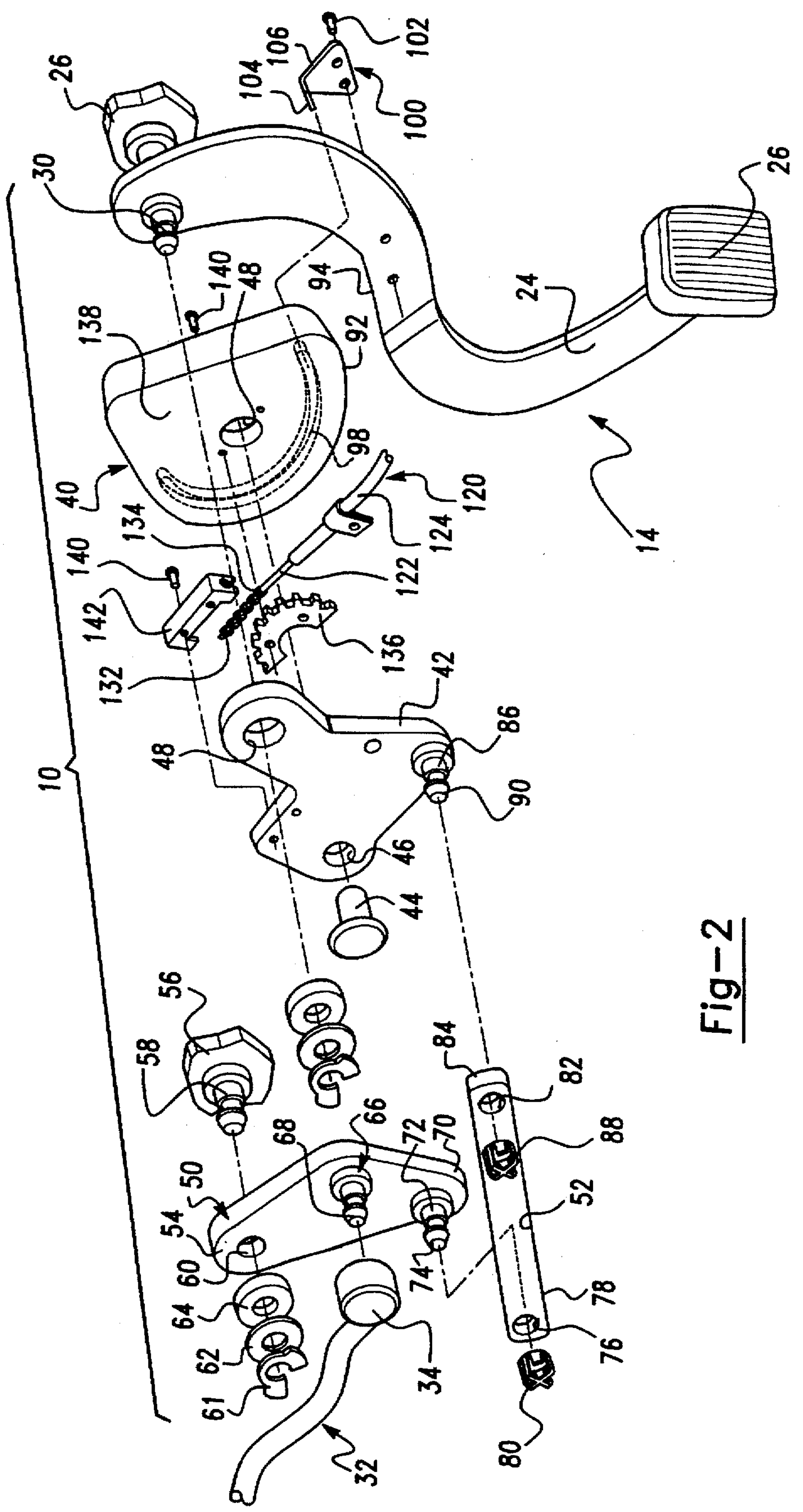
FIG. 2 is a partial exploded perspective view of the clutch pedal portion of the adjustable motor vehicle control pedal system of FIG. 1.

With reference to FIGS. 1 and 2, the control pedal system 10 is shown to include a plurality of control pedals, namely, a clutch pedal 14, a brake pedal 16 and an accelerator pedal 18. However, for purposes of clarity so as to assist in an understanding of the disclosure, the remainder of this detailed description will be primarily directed to the control pedal system 10 insofar as it relates to the clutch pedal 14. It will be understood by those skilled in the art that similar components are utilized for adjustment of the brake pedal 16 and the accelerator pedal 18.

In a conventional manner, the clutch pedal 14 is suspended just above the compartment floor 20 on the driver's side of the vehicle 21. The clutch pedal 14 is initially spaced a nominal distance from a driver's seat 22 so as to be operable by a driver having an "typical" physique. Conventionally, the driver's seat 22 is adjustable in a fore direction and in an aft direction so as to bring the driver closer to the control pedals 14, 16 and 18, or to displace the driver further from the control pedals 14, 16 and 18, depending upon the driver's particular physique and preference.

As illustrated most clearly in FIG. 2, the clutch pedal 14 generally includes a pedal arm 24 and a pedal foot pad 26. The pedal arm 24 is typically attached to a first frame portion 26 located beneath the instrument panel 28 of the vehicle 21 such that the pedal arm 24 is rotatable in a direction away from the driver. The pedal arm 24 is secured to the frame portion 26 by a pivot pin 30 and movable between a forward (e.g. toward the driver) or non-actuated position and a rearward (e.g. away from the driver) or actuated position.

Conventionally, the pedal arm 24 would be rotatably attached directly to a master cylinder pushrod 32 with a pivot pin which passes through both the pedal arm 24 and a first end 34 of the pushrod 32. However, as can be seen in FIG. 2, the pedal arm 24 of the present invention indirectly actuates the pushrod 32 through a cam member 40.

The cam member 40 is fixedly interconnected to a plate member 42 through a linking pin 44. The linking pin 44 is press fit through an aperture 46 passing through plate member 42 and an aperture 48 passing through cam member 40. Alternatively, cam member 40 and plate member 42 can be fixed relative to one another in any of a number of conventionally manners well known in the art. The plate member 42 is mounted for pivotal rotation on pivot pin 30. As a result, the plate member 42 shares a common axis of rotation (i.e. that defined by pivot pin 30) with the pedal arm 24. Accordingly, due to the fixed relationship between the pedal arm 24 and the plate member 42, rotation of the pedal arm 24 about pivot pin causes corresponding rotation of plate member 42 about pivot pin 30.

The plate member 42 is interconnected with the master cylinder pushrod 32 through first and second pivot links 50 and 52. Preferably, the first pivot link 50 is attached adjacent its upper end 54 to a second frame portion 56 with a pivot pin 58 which passes through an aperture 60. A retainer clip 61 is attached to the pivot pin 58 and functions to retain a spacer 62 and a washer 64. A pivot shaft 66 extends from the first pivot link 50 and includes a first end 68 in rotational engagement with the first end 34 of the master cylinder pushrod 32.

Adjacent its lower end 70, the first pivot link 50 includes a pivot shaft 72 having a first end 74 extending through an aperture 76 located in a first end 78 of the second pivot link 52. A retainer cap 80 captures the first end 74 of the pivot shaft 72 and retains the second pivot link 52 for pivotal interconnection with the first pivot link 50. The second pivot link 52 includes an aperture 82 located adjacent a second end 84 which rotatably receives a pivot shaft 86 extending from the plate member 42. Similar to pivot shaft 72, a retainer cap 88 captures a first end 90 of pivot shaft 86. The pedal arm 24 is maintained in its forward, non-actuated position by the biasing effect of the master cylinder pushrod 32 which conventionally functions to bias the pedal arm 24 toward the vehicle's passenger compartment.

Preferably, the cam member 40 is generally disc-shaped with a cam contour 92 disposed on an outer surface spaced radially outward from the cam's fixed interconnection with plate member 42. As best seen in FIG. 2, the cam contour 92 constitutes a significant portion of the outer surface of the cam member 40 such that the cam member 40 can be rotated relative to the pedal arm 24 as much as approximately 180 degrees while still operating within the range of the cam contour 92. The cam contour 92 is slidably disposed against a camming surface 94 provided on a rear surface of the pedal arm 24. As a result, rotation of the cam member 40 causes pivoting of the pedal arm 24 in one of a fore direction or an aft direction, depending upon the direction of rotation of the cam member 40.

The rate of rotation of the pedal arm 24 is also determined by the cam contour 92. Depending upon the preferred control parameters with which the pedal arm 24 is to be adjusted relative to the driver's seat 22, the cam contour 92 can be radially spaced from the cam's axis of rotation (i.e., pivot pin 30) so as to cause a constant rate of rotation of the pedal arm 24 given a constant rate of rotation of the cam member 40. Alternatively, the cam contour 92 can be shaped to provide a rate of rotation which varies as the pedal arm 24 rotates, thereby providing the driver with finer adjustment of the pedal arm 24 where the rate of rotation of the pedal arm 24 is lowest.

Cam member 40 includes an arcuate channel 98 spaced inwardly from the edge surface and adjacent the cam contour 92. The arcuate channel 98 cooperates with a retention bracket 100 to maintain positive contact between the cam surface of the cam member 40 and the pedal arm surface 94 of the pedal arm 24 to ensure positive mechanical action therebetween at all times. In this regard, the retention bracket 100, which is permanently attached to the pedal arm 24 by rivets 102 or other suitable fasteners, includes a flange 104 arranged perpendicular to a mounting portion 106. The flange 104 rides in the arcuate channel 98 as the cam member 40 is rotated relative to the pedal arm 24.

Figure 3:
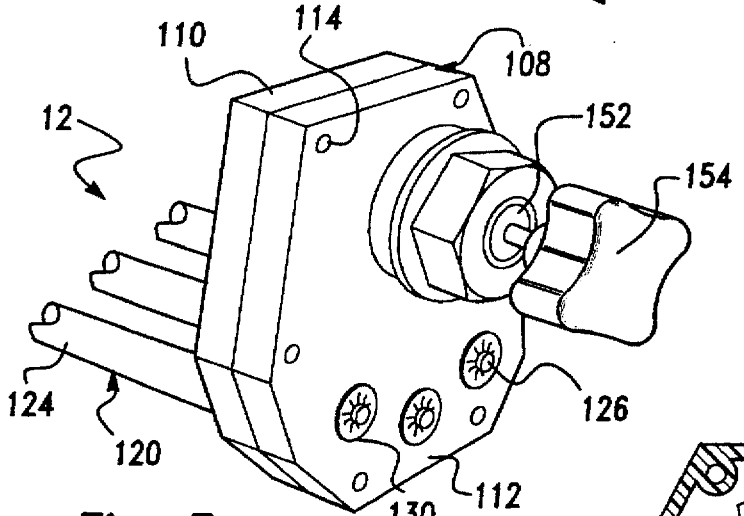
FIG. 3 is an enlarged perspective view of the manual control arrangement device of FIG. 1.
Figure 4:
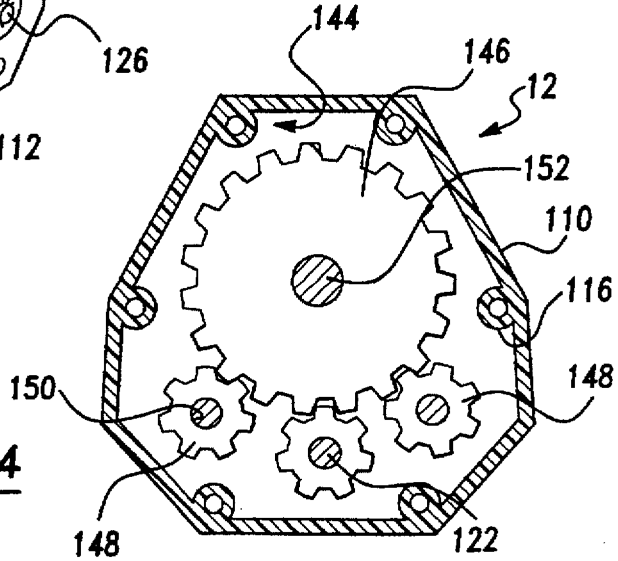
FIG. 4 is a top view of the manual control device of FIG. 3 illustrated with the cover of the housing removed in order to depict the gearing thereof.

With continued reference to FIGS. 1 and 2 and additional reference to FIGS. 3 and 4, the construction and operation of the manual control arrangement 12 of the present invention will now be detailed. The manual control arrangement 12 is illustrated to include a housing 108 mounted to the instrument panel 28. The housing 108 is of two-piece construction including a base portion 110 and a cover portion 112. The cover portion 112 is attached to the base portion 110 by fasteners (not shown) which pass through apertures 114 located in the cover portion 112 and engage internally threaded boss portions 116 formed with the base portion 110.

The manual control arrangement 12 further includes a plurality of rotatable bowden cables 120. In a conventional manner, each of the bowden cables 120 includes a rotatable cable member 122 and a flexible sheath 124. In the embodiment illustrated, the manual control arrangement 12 incorporates three (3) bowden cables 120, one being associated with each of the clutch pedal 14, brake pedal 16 and accelerator pedal 18. A first end 126 of each of the cable members 122 of the bowden cables 120 extends through apertures (not shown) located in the base portion 110 of the housing 108 and through an aperture (not shown) located in the cover portion 112 of the housing 108. The bowden cables 120 are retained longitudinally with respect to the housing 108 by retainer clips 130 surrounding the cable members 122 and positioned adjacent an outer surface of the cover portion 112 of the housing 108.

A second end 132 of each of the bowden cable 120 terminates in a lead screw 134 which is threadably engaged with an external geared portion 136 fixedly attached to a side surface 138 of the cam member 40 with rivets 140 or other suitable fasteners. A cover 142 is provided which is attached to the plate member 42 with rivets 140. The cover 142 functions to conceal the moving parts (i.e., the externally geared portion 136 and the lead screw 134). The lead screw 134 is preferably a helical drive screw which is rotated by the bowden cable 120. When the lead screw 134 is rotated in a manner that will be described below, the cam member 40 is selectively rotated in a clockwise or counterclockwise direction depending upon the direction of rotation of the lead screw 134. As a result, corresponding rotation of the pedal arm 24 relative its axis of rotation occurs.

As shown in FIGS. 4 and 5, a cavity 144 formed between the base portion 110 and the cover portion 112 of the housing 108 contains the gearing for selective rotation of the bowden cables 120. More particularly, the gearing contained within the housing 108 includes a sun gear or drive gear 146 and three (3) planet gears or driven gears 148. One of the driven gears 148 is associated with each of the bowden cables 120. The driven gears 148 are fixedly attached to a respective cable member 122 which passes through a centrally formed aperture 150 therein. In the preferred embodiment, the drive gear 146 is in constant meshing relationship with each of the driven gears 148 and is fixedly attached to a shaft 152 which upwardly extends from the housing 108. A manually operable device in the form of a manual adjustment knob 154 is attached to an upper end of the shaft 152 for manual rotation of the drive gear 146 and ultimate adjustment of the control pedals 14, 16, and 18. As illustrated in FIG. 1, the manual adjustment knob 154 extends into the passenger compartment of the vehicle 21 so that the driver can operate the manual control arrangement 12 comfortably from a seated position.

With particular reference to FIG. 4, the driven gears 148 of the manual control device 12 are illustrated to be uniform in size. Alternatively, it will be appreciated by those skilled in the art that varying sizes of driven gears 148 may be incorporated to accommodate parameters such as varying cam contours and non-uniform adjustment of the control pedals 14, 16 and 18. However, the uniform size of the driven gears 148 is preferred so as to achieve uniform adjustment of each of the control pedals 14, 16 and 18.

As noted above, the drive gear 146 is preferably in constant meshing relationship with each of the driven gears 148. Alternatively, the manual control arrangement may be modified to permit disengagement of one or more of the driven gears 148 from the drive gear 146. Such disengagement would allow independent adjustment of the individual control pedals 14, 16, 18. However, such an arrangement is not preferred since most applications will require simultaneous and uniform adjustment of the control pedals.

In operation, the adjustable control pedal system 10 is adjusted through selective rotation of the manual adjustment knob 154. For example, if the manual adjustment knob 154 is rotated in a first or clockwise direction as shown in FIGS. 1, 3 and 4, rotation of the shaft 152 causes corresponding clockwise rotation of the drive gear 146. Due to the meshing engagement between the drive gear 146 and the driven gears 148, the driven gears and their respective cable members 122 are each rotated in a counterclockwise direction. With reference to FIG. 2, this rotation of the cable member 122, including the lead screw 134 located at the end 132 of the cable member 122, causes clockwise rotation of the cam member 40 through engagement of the lead screw 134 and the gear portion 136. Consequently, the pedal arm 24 is rotated away from the driver. Rotation of the pedal arm 24 in a direction toward the driver is similarly accomplished by manually rotating the adjustment knob 154 in a counterclockwise direction.

While the above description constitutes the preferred embodiment of the invention, it will be appreciated that the invention is susceptible to modification, variation, and change without departing from the proper scope or fair meaning of the accompanying claims.

What is claimed is:

1. A manually adjustable control pedal system for a motor vehicle, the manually adjustable control pedal system comprising:

a plurality of control pedals, each control pedal having a pedal arm rotatable about an axis of arm rotation;

a corresponding plurality of camming members each having an axis of cam rotation, one of said camming members being juxtaposed with each of said pedal arms of said control pedals, each of said camming members including a gear portion;

a manually controlled drive arrangement for selectively rotating the camming members about their axes of cam rotation to produce a corresponding displacement of each of said control pedals, said manually controlled drive arrangement including:

(i) a housing defining a cavity;

(ii) a drive gear disposed in said cavity fixedly attached to a shaft, a first end of said shaft extending from said housing;

(iii) a control knob attached to said first end of said shaft;

(iv) a corresponding plurality of driven gears in meshing engagement with said drive gear; and (v) a corresponding plurality of rotatable cables, each rotatable cable having a first end operatively arranged with one of said driven gears and a second end terminating in a lead screw, said lead screw being operatively arranged with said gear portion of one of said camming members;

whereby selective rotation of said control knob operates to adjust said pedal arms of each of said plurality of control pedals in one of a fore direction and an aft direction.

2. The manually adjustable control pedal system for a motor vehicle of claim 1, wherein each said camming member includes a contour slot for maintaining positive engagement with one of said plurality of control pedals.

3. The manually adjustable control pedal system for a motor vehicle of claim 2, further comprising a corresponding plurality of brackets, each of said brackets mounted to one of said plurality of control pedals and including an end engaging said contour slot of an associated one of said camming members.

4. The manually adjustable control pedal system for a motor vehicle of claim 1, wherein each of said camming members includes a cam contour slidably disposed against an associated one of said plurality of control pedals.

5. A manually adjustable control pedal system for a motor vehicle, the manually adjustable control pedal system comprising:

a plurality of control pedals, each control pedal having a pedal arm rotatable about an axis of arm rotation;

a corresponding plurality of camming members each having an axis of cam rotation, each of said camming members being juxtaposed with said pedal arm of an associated one of said control pedals;

a manually controlled drive arrangement for selectively rotating the camming members about their axes of cam rotation to produce a corresponding displacement of each of said control pedals in response to a single input.

6. The manually adjustable control pedal system for a motor vehicle of claim 5, wherein said manually controlled drive arrangement is operative for concurrently displacing each of said plurality of control pedals.

7. The manually adjustable control pedal system for a motor vehicle of claim 6, wherein said manually controlled drive arrangement includes a rotatable element for selectively controlling displacement of said control pedals.

8. The manually adjustable control pedal system for a motor vehicle of claim 6, wherein said manually controlled drive arrangement includes:

(i) a housing defining a cavity;

(ii) a drive gear disposed in said cavity fixedly attached to a shaft, a first end of said shaft extending from said housing;

(iii) a control knob attached to said first end of said shaft;

(iv) a corresponding plurality of driven gears in meshing engagement with said drive gear; and (v) a corresponding plurality of rotatable cables, each rotatable cable having a first end operatively arranged with one of said driven gears and a second end operatively arranged with said gear portion of one of said camming members;

whereby selective manual rotation of said control knob operates to adjust said pedal arms of each of said plurality of control pedals in one of a fore direction and an aft direction.

9. The manually adjustable control pedal system for a motor vehicle of claim 8, wherein each of said camming members includes a gear portion and further wherein said second end of each of said plurality of rotatable cables terminates in a lead screw, each of said lead screws operatively arranged with said gear portion of one of said camming members.

10. The manually adjustable control pedal system for a motor vehicle of claim 5, wherein each camming member includes a contour slot for maintaining positive engagement with one of said plurality of control pedals.

11. The manually adjustable control pedal system for a motor vehicle of claim 10, further comprising a corresponding plurality of brackets, each of said brackets mounted to an associated one of said plurality of control pedals and including an end engaging said contour slot of an associated one of said camming members.

12. The manually adjustable control pedal system for a motor vehicle of claim 5, wherein each of said camming members includes a cam contour slidably disposed against an associated one of said plurality of control pedals.

13. A manually adjustable control pedal system for a motor vehicle operable from a passenger compartment of the vehicle, the manually adjustable control pedal system comprising:

a control pedal having a pedal arm rotatable about an axis of arm rotation;

a camming member having an axis of cam rotation, said camming member being juxtaposed with said pedal arm of said control pedal; and a manually controlled drive arrangement operative from the passenger compartment for selectively rotating the camming member about its axis of cam rotation to produce a corresponding displacement of said control pedal, said drive arrangement including:

a control knob for selectively controlling displacement of said control pedal, said control knob extending into the passenger compartment;

a rotatable cable operatively interconnecting said control knob and said camming member;

a housing defining a cavity; and a drive gear disposed in said cavity interconnected to said control knob;

whereby selective rotation of said control knob operates to adjust said pedal arm of said control pedal in one of a fore direction and an aft direction.

14. The manually adjustable control pedal system for a motor vehicle of claim 13, wherein said camming member includes a gear portion and said rotatable cable includes a first end terminating in a lead screw, said lead screw being operatively arranged with said gear portion of said camming members.

15. The manually adjustable control pedal system for a motor vehicle of claim 13, wherein said camming member includes a contour slot for maintaining positive engagement with said control pedal.

16. The manually adjustable control pedal system for a motor vehicle of claim 15, further comprising a bracket mounted to said control pedal, said bracket including an end engaging said contour slot of said camming member.

17. The manually adjustable control pedal system for a motor vehicle of claim 13, wherein said camming member includes a cam contour slidably disposed against said control pedal.

* * * * *